United States Patent [19]

Lawhorne

[11] Patent Number: 4,781,911
[45] Date of Patent: Nov. 1, 1988

[54] TIO₂ FOR CERAMIC FRITS AND GLAZES

[75] Inventor: Earl R. Lawhorne, Savannah, Ga.

[73] Assignee: Kemira, Inc., Savannah, Ga.

[21] Appl. No.: 37,205

[22] Filed: Apr. 10, 1987

[51] Int. Cl.⁴ .......................................... C01G 23/053
[52] U.S. Cl. ...................... 423/616; 423/82; 423/85; 106/436; 501/18
[58] Field of Search ............... 423/616, 85, 82; 106/300; 501/18

[56] References Cited

U.S. PATENT DOCUMENTS

| | | | |
|---|---|---|---|
| 3,211,528 | 10/1965 | Wigginton | 423/616 |
| 3,403,977 | 10/1968 | Heywood et al. | 423/616 |
| 4,014,977 | 3/1977 | Piccolo et al. | 423/85 |
| 4,073,877 | 2/1978 | Klein et al. | 423/616 |
| 4,098,869 | 7/1978 | Paolinelli et al. | 423/85 |
| 4,133,864 | 1/1979 | Yoshio et al. | 423/85 |
| 4,505,886 | 3/1985 | Cody et al. | 423/616 |

*Primary Examiner*—Robert L. Stoll
*Attorney, Agent, or Firm*—Hurt, Richardson, et al.

[57] ABSTRACT

A titanium dioxide compositon suitable for incorporation into ceramic frit, and process for preparation thereof. A clarified titanium sulfate liquor is hydrolyzed and precipitated to yield relatively large and uniform-sized hydrolysate particles which are easily separated from the acidic liquor by filtration.

7 Claims, No Drawings

TIO$_2$ FOR CERAMIC FRITS AND GLAZES

BACKGROUND OF THE INVENTION

The present invention relates to a titanium dioxide product suitable for incorporation into ceramic frit, and to a method for preparation of the titanium dioxide.

Commercially available pigmentary-TiO$_2$ cannot normally be utilized in the preparation of ceramic frit, due to the fact that this type of TiO$_2$ has a very small particle size and consequently a very large surface area which causes the formation of large agglomerates when all of the component ingredients of the ceramic frit are dry blended. These TiO$_2$ agglomerates possess a higher density and a higher melting point than the remainder of the frit ingredients and there is therefore a tendency for unmelted TiO$_2$ to sink to the bottom of the melt. This results in low TiO$_2$ content in the melt and non-uniform distribution of the TiO$_2$. If, however, the TiO$_2$ consists of larger discrete particles having relatively less surface area and less tendency toward agglomeration, the lower melting components of the frit aid in complete solution and melting of the TiO$_2$.

The following patents are illustrative of the prior art: U.S. Pat. No. 3,403,977 (Heywood) discloses a process for a TiO$_2$ product suitable for ceramic frit, which consists of modules which in turn are made up of aggregates of TiO$_2$ particles.

U.S. Pat. No. 3,211,528 (Wiggington) discloses a process for hydrolysis and calcination of a TiO$_2$ product for use in ceramic frit. This process involves a Blumenfeld-type hydrolysis, wherein the hydrolysis seed is formed in situ by adding liquor to water rather than by addition of already-formed nuclei. The resulting product is described as being free flowing and non-dusting, but it also involves a process wherein a significant portion of the hydrolysate must be neutralized, freed from its sulfate content, and treated with a peptizing agent prior to recombination with the major portion of the material before calcination is carried out.

SUMMARY OF THE INVENTION

It is accordingly an object of the invention to provide a process for providing titanium dioxide suitable for use in ceramic frit.

It is another object of the invention to provide a process, as above, in which the titanium dioxide is comprised of discrete particles which are larger than prior art particles, and therefore have a reduced tendency for agglomeration.

These objects are achieved by a method for manufacturing titanium dioxide particles suitable for use in preparation of ceramic frit, which comprises the steps of (a) preparing a clarified sulfuric acid solution containing soluble titanium sulfates, (b) adjusting the temperature of the solution to be between about 50° and about 95° C., (c) nucleating the solution with between about 0.1 and about 1.0% by weight titanium dioxide based on the titanium dioxide content of the solution, (d) heating the solution at a rate of from about 0.1° C. to about 1.0° C. per minute up to the boiling point of the solution, (e) simultaneously during the heating step, adding to the solution a quantity of water at a temperature substantially equal to the instantaneous temperature of the solution and constituting from about 10% to about 100% of the original solution volume, thereby forming a precipitated titanium dioxide hydrolysate, (f) filtering and washing the precipitated hydrolysate to remove soluble impurities, and (g) calcining the washed and filtered hydrolysate at a temperature sufficient to vaporize bound sulfates.

The objects of the invention are also achieved by a titanium dioxide product produced by the above process.

DETAILED DESCRIPTION OF THE PREFERRED EMBODIMENTS

Clarified liquor which comprises feedstock for the process of the invention can be prepared by the known method of digesting a titaniferous ore with sulfuric acid, preparing a solution by dissolving the digested cake in water, or acidified water, and further clarifying the liquor to remove suspended material. Liquor for hydrolysis may contain 100-180 grams TiO$_2$ per liter plus all other soluble sulfates (iron, aluminum, magnesium, chromium, etc.) derived from digesting the titaniferous ore. Free sulfuric acid may equal 1.5-2.5 moles per mole of TiO$_2$. A preferred range is 2.0 to 2.3 moles sulfuric acid per mole of TiO$_2$. A typical liquor would be as follows:

Specific Gravity—1.420
TiO$_2$—160 g/l
H$_2$SO$_4$13 350 g/l
FeSO$_4$—50 g/l
TiO$_2$ as Ti—2.5 g/l Liquor temperature is adjusted to between about 50° and about 95° C., and preferably to about 60° C. prior to initiating precipitation. The liquor is nucleated with 0.1–1.0% TiO$_2$ as hydrolysis seed based upon TiO$_2$ content of the liquor, while the preferred amount is from about 0.4 to about 0.5%. Liquor is heated at a controlled slow rate, typically 0.3° C./minute and generally from 0.1° C. to 1.0° C. per minute, up to the boiling point. The heating rate may also be varied such that a more rapid heating rate is used at the beginning and a slower heating rate is used during periods when hydrolysis and particle growth are most rapid, viz., at temperatures from about 90° C. to the boiling point of the liquor. During the heating period, a quantity of hot water equal to 10%–100% (50% preferred) of original liquor volume is added. Heating can be by direct steam injection, and in this case condensation is considered part of the dilution water. The dilution water can be added in virtually any manner, but for maximum benefit, dilution should be made at a slow rate during the period of maximum hydrolysis and particle growth. As mentioned above, this occurs from about 90° C. up to the boiling point. Dilution water should be at essentially the same instantaneous temperature of the liquor to avoid disrupting the heating schedule. In general, the rate of addition of hot water is from about 0.2 ml/min to about 2.0 ml/min per liter of total volume when the temperature of the liquor is below about 90° C., and is from about 3 ml/min to about 8 ml/min per liter of total volume when the temperature of the liquor is above about 90° C.

After hydrolysis is completed, the precipitated hydrolysate is filtered and washed with hot water to remove soluble impurities. Washed hydrolysate will contain color-imparting impurities such as iron and chromium in the amount of a few parts per million on a TiO$_2$ basis. Further purification may be obtained by heating hydrolysate in a hot, dilute sulfuric acid solution in the presence of a reducing agent and then re-washing. The final washed product is then calcined, without additives, at 850°–1000° C. to vaporize bound sulfates which are unacceptable in ceramic frit. Calciner discharge may be mikropulverized to ensure passing a 200 mesh screen.

An important feature of the invention is the particular combination of nucleation, specific heating schedule and dilution, which is used to control the particle size growth during hydrolysis and to yield a final hydrolysate which is made up predominately of relatively large and uniformly sized particles. This leads to a final product which will be essentially non-sticking, free flowing and suitable for incorporation into ceramic frit. After calcination, the $TiO_2$ of the invention normally consists of free flowing, essentially unaggregated particles, which may be more than 90% minus 200 mesh in size. Only a light mikropulverizing is needed to meet the normal specification of 99+% to pass through a 200 mesh screen. Actual crystal structure may range from 0–100% rutile depending on calcination time and temperature.

The following examples illustrate the invention:

EXAMPLE 1

Titaniferous ores are digested in sulfuric acid and subsequently put into an aqueous solution containing sulfates of titanium plus all the sulfatable impurities which were originally present in the ore. These include aluminum, chromium, iron, manganese, vanadium and other trace metals. The principal impurity is iron, which is present as $FeSO_4$. The liquor normally will have a ratio of 0.4 to 0.5 parts $FeSO_4$ to each equivalent $TiO_2$. The digestion liquor is clarified by a combination of flocculation and filtration to remove undissolved, suspended particles. Liquor for experimentation is taken, at this stage, from the existing commercial process for producing pigmentary titanium dioxide.

Precipitation was carried out in a 5 liter, 3 neck, round bottom Pyrex flask. This was externally heated by an electric heating mantle. The center neck accommodated the stirring assembly and one side neck was fitted with a water cooled reflux condenser. The remaining opening was used for additions, sampling and temperature measurement.

Digestion liquor had an equivalent $TiO_2$ content of 166.8 g/l. Sulfuric acid concentration (not combined with impurities) was 338.3 g/l to give $H_2SO_4/TiO_2$ ratio of 2.03. Digestion liquor (2.1 liters) was heated to 95° C. and then added, at a uniform rate, in nine minutes, to 700 ml of water which was also at 95° C. in the flask. Batch temperature was then raised to boiling and held for 3½ hours. The resulting precipitate was filtered, washed with several displacements of hot water and dried at 110° C. Calcination was carried out at 850° C. for one hour. Calciner discharge was a soft, friable powder. Bulk density was 0.96 g/cc when tapped to give uniform settling in the cylinder. The desired density for this product is about 1.6 g/cc.

EXAMPLE 2

Digestion liquor containing 169.4 g/l $TiO_2$ and having an $H_2SO_4/TiO_2$ ratio of 2.09 was precipitated in the same equipment used in Example 1, but the procedure was modified. Digestion liquor (2.25 liters) was added to a flask and heated to 56° C. before adding a volume of $TiO_2$ hydrolysis "seed" slurry equivalent to 0.5% $TiO_2$ on basis of $TiO_2$ contained in the liquor. The batch was heated to 90° C. (no specific heating rate followed) and hot water (90° C.) was added to give one volume of dilution water to two volumes of liquor. Heating was continued to boiling and the liquor was maintained at boil for 3½ hours. Filtering, washing, drying and calcining were carried out as in Example 1. Calciner discharge was soft friable powder with tapped density of 1.22 g/cc.

EXAMPLE 3

Digestion liquor (2.5 liters) which had been adjusted to contain 172.8 g/l $TiO_2$ and $H_2SO_4/TiO_2$ ratio of 2.21 by addition of 53% $H_2SO_4$ solution was nucleated at 56° C. by adding 0.4% $TiO_2$ as hydrolysis seed. The liquor was then heated at a controlled rate of 0.3° C./min to 90° C. Hot (90° C.) water was added equal to one half the original volume of liquor during a 10 minute period. Heating was continued at the same rate and the liquor was boiled three hours, followed by filtering, washing, drying and calcining as described. The final product was soft and friable and had a tapped density of 1.69 g/cc.

EXAMPLE 4

To 2.5 liters of clarified digestion liquor containing $TiO_2$ equivalent of 171.5 g/l was added 0.45 liters of end liquors, i.e. recovered weak acid from plant precipitation step, to adjust $H_2SO_4/TiO_2$ ratio to 2.21. The batch was heated to 56° C. and 0.4% $TiO_2$ was added as hydrolysis "seed" slurry. The heating rate was adjusted to 0.25° C. per minute up to a batch temperature of 90° C. At this point hot water was added at 50–100 ml/min until total dilution was equal to one half the original liquor volume. (Note that this total dilution included end liquor plus hydrolysis seed and hot water.) Heating was continued at the same rate up to boil and then the batch was boiled three hours, followed by filtering, washing and processing through calcination as described, except that calcination temperature was 1000° C. The calciner discharge was soft, friable and had a tapped bulk density of 1.67 g/cc.

EXAMPLE 5

Precipitation was carried out in an 18 liter size tank with vented stack. To 8.0 liters of clarified digestion liquour containing 161.5 grams $TiO_2/l$ was added 1.42 liters of end liquor to adjust the $H_2SO_4/TiO_2$ ratio to 2.22. The liquor was preheated to 56° C. and then added to the tank. Immediately thereafter 0.40% $TiO_2$ was added as hydrolysis seed and heating was started by direct steam injection. The heating rate was controlled to give a rise of 0.5° C./min up to 70° C. batch temperature and 0.3° C./min up to 90° C. At this point hot water was added at 100 ml/min until 1.6 liters were added. The heating rate was adjusted to 0.2° C./min up to boil. Boiling was continued for three hours. The precipitated $TiO_2$ hydrolysate was recovered by filtration and washed until the filtrate was free of soluble iron. The hydrolysate was then reslurried in water, acidified with $H_2SO_4$ plus a reducing agent, and heated to 70°–75° C. for one hour. Bleached $TiO_2$ hydrolysate was again recovered by filtration and washed with additional hot water. The bleaching step serves the purpose of reducing impurity levels to an allowed level. This has no effect upon particle size or tapped bulk density. Calcination was carried out at 1000° C. Calciner discharge was a soft, friable powder with the smooth feel of talcum powder. Tapped bulk density was 1.67 g/cc. Iron and chromium impurity levels were reduced to 16.3 and 2.5 ppm, respectively.

EXAMPLE 6

A volume of 12,000 gallons of clarified digestion liquor containing 1.45 lb. $TiO_2$/gal, plus 2355 gallons of end liquor were transferred into the precipitation vessel. Adjusted $H_2SO_4/TiO_2$ ratio was 2.21. Added 0.40% $TiO_2$ as hydrolysis seed, based upon weight of $TiO_2$ in batch. Heating rate, by direct steam injection, was maintained at 0.5° C./min up to 80° C. and then at 0.25° C./min up to 90° C. At this point, 3000 gallons of hot water were added at a rate of 60 gal/min. The heating rate was adjusted to 0.2° C./min up to boil. Boiling was continued for three hours. Precipitated $TiO_2$ hydrolysate was recovered by filtration and washed until soluble iron was no longer detected. Washed hydrolysate was then reslurried and acidified with sulfuric acid and a reducing agent. The batch was heated to 70°-75° C. and held for one hour before refiltering and washing again. Bleached $TiO_2$ hydrolysate was calcined at 1000° C. The calciner discharge was soft, friable and had the feel of talcium powder. Tapped bulk density was 1.75 g/cc.

What is claimed is:

1. A method for manufacturing titanium dioxide particles suitable for use in preparation of ceramic frit, comprising the steps of:
   (a) preparing a clarified sulfuric acid solution containing soluble titanium sulfates;
   (b) adjusting the temperature of said solution to between about 50° C. and about 95° C.;
   (c) nucleating said solution with between about 0.1 and about 1.0% by weight titanium dioxide based on the titanium dioxide content of the solution;
   (d) heating said solution at a rate of from about 0.1° C. to about 1.0° C. per minute up to the boiling point of said solution;
   (e) simultaneously during said heating step, adding to said solution a quantity of water at a temperature substantially equal to the instantaneous temperature of said solution and constituting from about 10% to about 100% of the original solution volume, thereby forming a precipitated titanium dioxide hydrolysate;
   (f) filtering and washing said precipitated hydrolysate to remove soluble impurities; and
   (g) calcining said washed and filtered hydrolysate at a temperature sufficient to vaporize bound sulfates.

2. A method as claimed in claim 1, wherein said solution is nucleated with from about 0.4 to about 0.5% titanium dioxide based on the titanium dioxide content of the solution.

3. A method as claimed in claim 1, wherein the quantity of hot water added in step (e) is about 50%.

4. A method as claimed in claim 1, wherein the rate of addition of said hot water in step (e) is from about 0.2 ml/min to about 2.0 ml/min per liter of total volume when the temperature of said solution is below about 90° C. and is from about 3 ml/min to about 8 ml/min per liter of total volume when the temperature of said liquor is above about 90° C.

5. A method as claimed in claim 1, wherein said method includes the step of heating said precipitated hydrolysate after said filtering and washing step in a sulfuric acid solution in the presence of a reducing agent, followed by rewashing of said precipitated hydrolysate.

6. A method as claimed in claim 1, wherein said calcining temperature is from about 850° C. to about 1000° C.

7. A method as claimed in claim 1, wherein said method includes milling said hydrolysate after said calcining to a degree such that said hydrolysate passes through a 200 mesh screen.

* * * * *